United States Patent [19]

Robeson et al.

[11] Patent Number: 4,497,924
[45] Date of Patent: Feb. 5, 1985

[54] AROMATIC POLYFORMAL BLENDS

[75] Inventors: Lloyd M. Robeson, Whitehouse Station; James E. Harris, Piscataway; Louis M. Maresca, Belle Mead, all of N.J.

[73] Assignee: Union Carbide Corporation, Danbury, Conn.

[21] Appl. No.: 485,949

[22] Filed: Apr. 18, 1983

[51] Int. Cl.$^3$ ............................................. C08K 5/51
[52] U.S. Cl. ................................. 524/151; 525/66; 525/67; 525/68; 525/146; 525/147; 525/148; 525/151; 525/166
[58] Field of Search ................. 525/150, 219, 64, 67, 525/68, 66, 146, 147, 148, 151, 166; 524/141, 151

[56] References Cited

U.S. PATENT DOCUMENTS 3,069,386 12/1962 Barclay .............................. 260/49
3,686,362 8/1972 Hinckley et al. .................. 525/150
3,966,677 6/1976 Sonoyama et al. ................ 524/141
4,374,974 2/1983 Hay ................................... 528/219

FOREIGN PATENT DOCUMENTS 2738962 5/1978 Fed. Rep. of Germany.

Primary Examiner—Jacob Ziegler
Attorney, Agent, or Firm—George A. Skoler

[57] ABSTRACT

A moldable and compatible blend of 5 to 95 weight percent of an aromatic polyformal comprising from about 20 weight percent to 100 weight percent of repeating units (I) having the formula

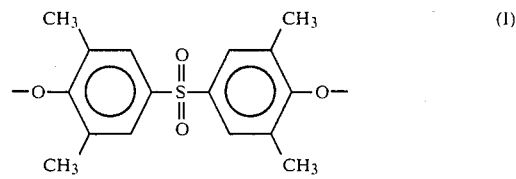

and from 0 weight percent to about 80 weight percent of repeating units (II) having the formula

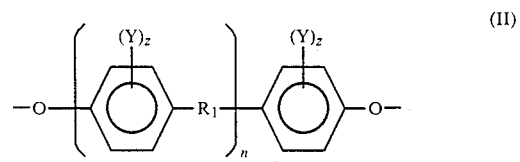

in which the repeating units (I) and the repeating units (II) are connected by interbonding units (III) having the formula $-CH_2-$ (III)

wherein Y is selected from alkyl groups of 1 to 4 carbon atoms, chlorine or bromine, each z, independently, has a value of from 0 to 4 inclusive, n has a value of 0 or 1, and $R_1$ is a divalent saturated or unsaturated aliphatic hydrocarbon radical, O, CO, SO$_2$, S or a direct bond, with the proviso that when $R_1$ is SO$_2$ then repeating unit (II) is not the same as repeating unit (I), and 95 to 5 weight percent of a styrene copolymer or terpolymer and/or vinyl chloride containing polymers.

21 Claims, No Drawings

AROMATIC POLYFORMAL BLENDS

BRIEF SUMMARY OF THE INVENTION

TECHNICAL FIELD

This invention relates to compatible blends of aromatic polyformals which contain oxymethylenebis-(3,5-dimethyl-4-hydroxyphenyl)sulfone as a structural unit; with styrene polymers and/or vinyl chloride containing polymers.

BACKGROUND OF THE INVENTION

Polyformals based on Bisphenol-A were first reported by Barclay, U.S. Pat. No. 3,069,386. They were made by reaction of the anhydrous disodium salt of Bisphenol-A with one equivalent of bromochloromethane in dimethyl sulfoxide. More recently, Hay, et al, in a recent presentation entitled "Synthesis of New Aromatic Polyformals", at the 1982 Fall ACS Meeting in Kansas City, Mo. addressed their manufacture.

German Offen. No. 2,738,962, May 11, 1978, based on U.S. application Ser. No. 739,562, filed Nov. 8, 1976, now U.S. Pat. No. 4,124,875, describes the manufacture of aromatic polyformal resins of which the units have structure —OROCH$_2$— wherein R is an arylene of 6 to 30 carbon atoms and the resin has an intrinsic viscosity of about 0.3 dl/g, measured in chloroform at 25° C. They are prepared specifically from Bisphenol-A, an excess of methylene halides, and an alkali metal hydroxide.

German Offen. No. 2,819,582, published Sept. 27, 1979, based on U.S. application Ser. No. 889,393, filed Mar. 23, 1978, now abandoned describes flexible, film-forming polyformals having the repeating structure:

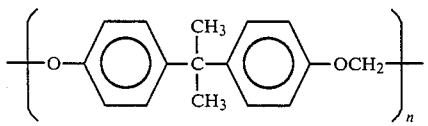

which are manufactured by the reaction of one mole of Bisphenol-A and at least a stoichiometrically equivalent amount of methylene halide in the presence of at least a stoichiometrically equivalent amount of an alkali metal hydroxide and a phase transition catalyst with or without a dipolar aprotic solvent. This patent publication appears to correspond to the Hay et al ACS publication.

There appears to be no prior art directed to the employment of such polyformals with other resins, in particular with styrene copolymers and vinyl chloride as polymers, herein set forth.

The aromatic formals of this invention are described in copending application Ser. No. 485,947, now abandoned commonly assigned, filed on even date herewith.

DISCLOSURE OF THE INVENTION

The present invention involves moldable and compatible blends of aromatic polyformals and styrene copolymers and/or vinyl chloride containing polymers which possess superior molding characteristics and physical properties.

The aromatic polyformals used in the practice of this invention comprise from about 20 weight percent to 100 weight percent of repeating units (I) having the formula

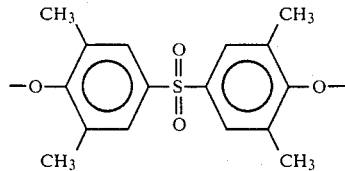

and from 0 weight percent to about 80 weight percent of repeating units (II) having the formula

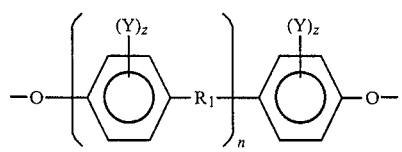

in which the repeating units (I) and the repeating units (II) are connected by interbonding units (III) having the formula $$-CH_2- \qquad (III)$$

wherein Y is selected from alkyl groups of 1 to 4 carbon atoms, chlorine or bromine, each z, independently, has a value of from 0 to 4 inclusive, n has a value of 0 or 1, and R$_1$ is a divalent saturated or unsaturated aliphatic hydrocarbon radical, particularly an alkylene or alkylidene radical having from 1 to 6 carbon atoms, or a cycloalkylidene or cycloalkylene radical having up to and including 9 carbon atoms, O, CO, SO$_2$, S or a direct bond.

The aromatic polyformals employed in this invention can be terminated by end capping units (IV) having the formula $$-OR_2 \qquad (IV)$$

bonded to the interbonding units (III) and/or end capping units (V) having the formula $$-R_3 \qquad (V)$$

bonded to the repeating units (I) and/or (II), wherein R$_2$ and R$_3$ are monovalent organic alkyl radicals having from 1 to about 8 carbon atoms, cycloalkyl having from about 5 to about 10 carbon atoms, aryl containing not more than about 3 aromatic rings, and R$_3$ can further be an alkyl acyl, cycloalkyl acyl or aryl acyl radical.

The above aromatic polyformal polymers are produced by reacting the alkali metal salts of repeating units (I) and (II) with at least one dihalomethane compound. This process is described more fully in copending U.S. patent application Ser. No. 485,947, now abandoned filed on an even date herewith.

The styrene copolymers or terpolymers suitably employable in the practice of this invention are well known in this art. Included among the preferred copolymers are the styrene containing copolymers such as the styrene-acrylonitrile copolymers (SAN), styrene-acrylonitrile-alkyl styrene copolymers, styrene-acrylonitrile-butadiene copolymers (ABS), and the like.

The vinyl chloride polymers suitable for use herein are polyvinyl chloride and copolymers of vinyl chloride with olefinically unsaturated polymerizable compounds which contain at least 50 percent by weight of vinyl chloride incorporated therein.

DETAILED DESCRIPTION

The aromatic polyformals employed in the blends of this invention can be prepared by the interreaction of bisphenol compounds which give repeating units (I) and repeating units (II) having the formulas described above. Such bisphenol compounds include bis-(3,5-dimethyl-4 hydroxyphenyl)sulfone, and optionally 2,2-bis-(4-hydroxyphenyl)propane ("Bisphenol A") and/or bis-(4-hydroxyphenyl)sulfone, which are reacted in the amounts defined with a dihalomethane to produce the aforedefined aromatic polyformals employed in this invention. More particularly the preparation is achieved by the reaction of the aforementioned bisphenol compound in the presence of sufficient alkali metal to theoretically form at least the dialkaline metal salt of the aforementioned phenyllic compounds. More preferentially, the polymers are produced in the presence of a solvent for the monomers and the resulting polymer.

Suitable bisphenol compounds which give repeating units (II) having the formula described above, in addition to 2,2-bis-(4-hydroxyphenyl)propane (Bisphenol A) and bis-(4-hydroxyphenyl)sulfone, include bis-(4-hydroxyphenyl)methane, 2,2-bis(4-hydroxy-3-methylphenyl)propane, 4,4-bis-(4-hydroxyphenyl)heptane, 2,2-(3,5,3',5'-tetrachloro-4,4'-dihydroxydiphenyl)propane, 2,2-(3,5,3',5'-tetrabromo-4,4'-dihydroxydiphenyl)propane, and bis-(3-chloro-4-dihydroxyphenyl)methane. Other bisphenol compounds are also available and are disclosed in U.S. Pat. Nos. 2,999,835, 3,028,365 and 3,334,154.

The polymers employed in this invention can be formed in a number of ways. The methods which are employable can be classified as either a two-step process or a one-step process.

The two-step process involves a first step of reacting a slightly less than a molar equivalent of dihalomethane with the hydrated disodium or dipotassium salt(s) of bis-(3,5-dimethyl-4-hydroxyphenyl)sulfone, alone or with bisphenol compounds which give repeating units (II) having the formula described above, for example, with Bisphenol A and/or bis(4-hydroxyphenyl)sulfone in the proportions desired, in a highly polar solvent such as a dimethylsulfoxide, then adding an azeotropic solvent such as benzene or toluene, and a small amount of a base and dehydrating by azeotropic distillation. In the second step another portion of dihalomethane is added to give a slight excess, about 1 to 5%, over stoichiometry which on reaction causes marked increase in the viscosity of the polymer. It is believed that the excess amount of dihalomethane is required to make up for hydrolysis of the polymer or evaporation losses of dihalomethane during the manufacture of the polymer. In the first step a low molecular weight polymer is formed, termed herein an "oligomer", and the second step advances the polymerization of the oligomer by reaction with dihalomethane.

The one-step approach involves mixing the polar solvent and the salt of the bisphenols, as aforedescribed, to form a solution and dehydrating the solution before the addition of the dihalomethane. This one-step process is advantageous in that an excess of dihalomethane is not essential for high molecular weight polymer formation. The polymers made in this manner are invariably thermally stable, whereas polymers made by the two-step process may, with the application of heat, increase in molecular weight or even partially gal, presumably as a result of side-reactions of by-product methylol groups.

Another method which can be employed in preparing the aromatic polyformals involves mixing and heating in the polar solvent, the bisphenols, essentially 2 equivalents of an alkali and/or an alkali earth metal hydroxide and a large excess of the dihalomethane compound as aforedescribed in the absence of an azeotropic agent.

The terminal units of the polymer, —O—$R_2$ and —$R_3$, are formed by the addition of chain stoppers that are mono-hydroxy organic compounds or mono-halogenated organic compounds, respectively, to the reaction mixture. Examples of suitable mono-hydroxy compounds are hydroxy-aromatics such as phenol, cresol, and the like. Examples of suitable mono-halogenated organic compounds include mono-halo-alkanes such as methyl chloride, chloroethane, isopropyl chloride, methyl bromide, cyclohexyl chloride, and the like, and mono-halo-alkyl-aromatics such as benzyl chloride, benzyl bromide, cyclohexylchloride, and the like, and alkyl or aromatic aryl halides such as acetyl chloride, benzoyl chloride and the like.

The aromatic polyformals employed in this invention can have high molecular weight, indeed, molecular weights characterized by a reduced viscosity of at least about 0.2 dl/g as determined in chloroform at 25° C. (0.5 gram per 100 cc).

The preparation of the aromatic polyformals is carried out in the presence of highly polar solvents, such as dimethylsulfoxide (DMSO), dimethylformamide (DMF), dimethylacetamide (DMAC), N-methylpyrrolidone (NMP), dimethyl sulfone, diphenyl sulfone, sulfolane (tetramethylenesulfone), glycol ethers such as diglyme, triglyme, tetraglyme, and the like, and arylethers, such as diphenylether.

Dihalomethanes, such as methylene chloride, react rapidly in the aforementioned solvents, in particular in dimethylsulfoxide, with the bisphenols, bis-(3,5-dimethyl-4-hydroxyphenyl)sulfone, optionally with bisphenol compounds which give repeating units (II) having the formula described above, for example, 2,2-(4-hydroxyphenyl)propane and/or bis-(4-hydroxyphenyl)sulfone, to readily achieve high molecular weight polyformals. The salt form of the bisphenyls can be that of any of the alkali metals, or alkali earth metals for example sodium, potassium, cesium and rubidium, calcium, magnesium and the like. The alkali metal salts are the most preferred.

The temperature of the reaction is not critical, temperatures of at least about 25° C. are believed desirable to achieve any reaction. To achieve a reaction within a reasonable period of time, a temperature of at least 50° C. is desirable. In the usual case, temperatures of at least 60°–70° C. are employed for polymer formation. It is oftentimes desireable to operate the polymerization reaction over a varient temperature range, one which is commensurate with the degree of polymerization sought. Thus, as higher molecular weight polymers are desired, the temperature can be ever increased to achieve the same.

One of the problems with increasing temperature, of course, stems with the ability of the solvent to withstand degradation at those temperatures. In the preferred embodiment, a solvent which is stable at the reaction temperatures employed is used. However, should the solvent not be as stable as one desires at the temperature required to achieve the desired molecular weight, then a second and more heat stable solvent or polymer solvating agent should be added. For example, in this way, one can start with a relatively active but thermally unstable solvent for low molecular weight polymerization, introduce a second solvent which is less active at the initial temperature but has a better stability at higher temperatures, to advance the molecular weight to the desired level. Indeed a third solvent can be introduced which is even higher boiling and more stable than the second solvent in order to maximize the level of polymer molecular weight formation. Illustrative is the solvent sequence of dimethylsulfoxide, followed by sulfolane, followed by diphenylsulfone or diphenylether, and the like.

In some instances the molecular weight may not be obtainable by redissolving the polymer. The same aforementioned solvents can be used for the same purpose by solvating the polymer that is swelling it sufficiently without actually dissolving it to allow the polymer to react further, at high temperatures, and thereby advance in molecular weight.

The process pressures are not narrowly critical. Pressures ranging from subatmospheric to superatmospheric pressures are employable. For example, subatmospheric pressures may be desirable to enhance condensation conditions while superatmospheric conditions may be desirable for advancing the molecular weight of already polymerized materials.

The styrene copolymers (i.e. styrene resins) suitable for use herein include styrene/acrylonitrile copolymers, especially ABS type polymers, the molecules of which contain two or more polymeric parts of different compositions that are bonded chemically. The ABS type polymers are preferably prepared by polymerizing a conjugated diene, such as butadiene or a conjugated diene with a monomer copolymerizable therewith, such as styrene, to provide a polymeric backbone. After formation of the backbone, at least one grafting monomer, and preferably two, are polymerized in the presence of the prepolymerized backbone to obtain the graft polymer. These resins are prepared by methods well known in the art.

The backbone polymer, as mentioned, is preferably a conjugated diene polymer such as polybutadiene, polyisoprene, or a copolymer, such as butadiene-styrene, butadiene-acrylonitrile, or the like.

The specific conjugated diene monomers normally utilized in preparing the backbone of the graft polymer are generically described by the following formula:

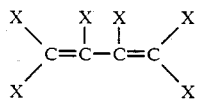

wherein X may be hydrogen, alkyl groups containing from one to five carbon atoms, chlorine or bromine. Examples of dienes that may be used are butadiene, isoprene, 1,3-heptadiene, methyl-1,3-pentadiene, 2,3-dimethyl-1,3,-butadiene, 2-ethyl-1,3-pentadiene; 1,3- and 2,4-hexadienes, chloro and bromo substituted butadienes such as dichlorobutadiene, bromobutadiene, dibromobutadiene, mixtures thereof, and the like. A preferred conjugated diene is butadiene.

One monomer or group of monomers that may be polymerized in the presence of the prepolymerized backbone are the styrenes, such as: styrene, 3-methylstyrene; 3,5-diethylstyrene, 4-n-propylstyrene, α-bromostyrene, dichlorostyrene, dibromostyrene, tetrachlorostyrene, mixtures thereof, and the like. The preferred monovinylaromatic hydrocarbons used are sytrene and/or a α-methylstyrene.

A second group of monomers that may be polymerized in the presence of the prepolymerized backbone are acrylic monomers such as acrylonitrile, substituted acrylonitrile and/or acrylic acid esters, exemplified by acrylonitrile, and alkyl acrylates such as ethyl acrylate and methyl methacrylate.

The preferred acrylic monomer is acrylonitrile and the preferred acrylic acid esters are ethyl acrylate and methyl methacrylate.

In the preparation of the graft polymer, the conjugated diolefin polymer or copolymer exemplified by a 1,3-butadiene polymer or copolymer comprises about 60% by weight or less of the total graft polymer composition. The monomers polymerized in the presence of the backbone, exemplified by styrene and acrylonitrile, comprise from about 40 to about 95% by weight of the total graft polymer composition.

The second group of grafting monomers, exemplified by acrylonitrile, ethyl acrylate or methyl methacrylate, of the graft polymer composition, preferably comprise from about 10% to about 40% by weight of the total graft copolymer composition. The styrenes may comprise from about 30 to about 80% by weight of the total graft polymer composition.

In preparing the polymer, it is normal to have a certain percentage of the polymerizing monomers that are grafted on the backbone combine with each other and occur as free copolymer. If styrene is utilized as one of the grafting monomers and acrylonitrile as the second grafting monomer, a certain portion of the composition will copolymerize as free styrene-acrylonitrile copolymer. In the case where α-methylstyrene (or other monomer) is substituted for the styrene in the composition used in preparing the graft polymer, a certain percentage of the composition may be an α-methylstyrene-acrylonitrile copolymer. Also, there are occasions where a copolymer, such as α-methylstyrene-acrylonitrile, is added to the graft polymer copolymer blend. When the graft polymer-copolymer blend is referred to herein, it is meant optionally to include at least one copolymer blended with the graft polymer composition and which may contain up to 90% of free copolymer.

Optionally, the elastomeric backbone may be an acrylate rubber, such as one based on n-butyl acrylate, ethylacrylate, 2-ethylhexylacrylate, and the like. Additionally, minor amounts of a diene may be copolymerized in the acrylate rubber backbone to yield improved grafting with the matrix polymer.

The vinyl chloride polymers are as aforedescribed include vinyl chloride homopolymer and copolymers. Olefinically unsaturated compounds which are suitable for copolymerization include vinylidene halides, such as vinylidene chloride and vinylidene fluoride, vinyl esters, such as vinyl acetate, vinyl propionate, vinyl butyrate, vinyl chloroacetate, vinyl benzoate, acrylate and α-alkyl-acrylate and their alkyl esters, amides and nitriles, methacrylic acid, maleic acid or anhydride, methyl methacrylate, ethyl acrylate, 2-ethylhexylacrylate, butyl methacrylate, 2-hydroxypropyl acrylate, acrylamide, N-methyl acrylamide, acrylonitrile and methacrylonitrile, aromatic vinyl compounds, such as styrene and vinyl naphthalene and olefinically unsaturated hydrocarbons such as ethylene, bicyclo-[2,2,1]- hept-2-ene and bicyclo-[2,2,1]-hepta-2,5-diene. Polymerized vinyl acetate may be hydrolyzed to provide vinyl alcohol moieties in the polymer.

These vinyl chloride polymers are well known in the art and can be prepared by the usual methods of solution, emulsion, suspension, bulk or mass polymerization.

Vinyl chloride polymers which have molecular weights of from about 40,000 to about 60,000 are preferred.

These resins are well known in the art and many are commercially available.

The amount of styrene copolymer or vinyl chloride polymer added to the aromatic polyformal may vary widely depending upon the properties sought from the molded products made from the blend. Though in the usual case there will be employed from about 25 to 75 weight percent of the aromatic polyformal to about 75 to 25 weight percent of the styrene copolymer and/or vinyl chloride polymer. In the broadest sense, that range may be expanded to 95/5 of one polymer to the other class of polymer. Mixtures of the styrene copolymers or terpolymers and the vinyl chloride polymer with the polyformals are contemplated within the invention.

Blending may be done in the usual fashion, such as by simple mixing of powders of the polymers, though usually in an extruder mixer. The extruded product will be a melt mixture of the polyformal and the styrene copolymer and/or vinyl chloride containing polymer. Such can be pelleted and used as such in making molded articles of commerce.

The mixture of the two polymers is usually effected above the melting temperatures of the polymers. Usually mixing is effected at a temperature above 240° C. and typically not above 320° C. for styrene based systems. Temperatures lower than 220° C. will be required for the vinyl chloride based polymers.

Polyvinyl chloride resins (PVC) exhibit lower heat distortion temperatures (limit of 70°–75° C.) than ABS. As with ABS, α-methyl styrene-acrylonitrile copolymers can be added to PVC to enhance the heat distortion temperature. It has been found that tetramethyl Bisphenol-S polyformal is miscible with PVC and ABS and increases the heat distortion temperature of both of them.

Blends of ABS or polyvinylchloride (PVC) with the polyformals employed in this invention have increased heat distortion temperature and thus will allow for a broader range of end-use applications. With PVC, dark exterior siding, dark thermoformed panels, appliances requiring specific heat distortion temperatures, hot water pipe, containers for hot-fill applications, or where boiling or hot water exposure is required are typical applications where the aromatic polyformal addition will be desired. With ABS, appliance applications, boiling water exposure, electrical/electronic parts exposed to higher temperatures, plating applications, and automotive applications are examples of areas where increased heat distortion temperature of ABS is desired.

Additionally the blends of the aromatic polyformal described in this patent with a styrene copolymer or terpolymer and/or a vinyl chloride containing polymer may contain additives typically blended with polymeric materials to improve performance. These additives include antioxidants, thermal stabilizers, flow aids, inorganic fillers, fiberglass, flame retardants such as decabromodiphenyloxide and triarylphosphate esters.

Additionally, polymers exhibiting mechanical compatibility with the blends described herein may also be included. These polymers include aromatic polycarbonate, polyesters, polyarylates, poly(aryl ethers), poly(ether imides) and the like.

EXAMPLES

EXAMPLE 1

Into a 250 ml flask equipped with a mechanical stirrer, reflux condenser and nitrogen inlet was charged 45.90 g. (0.15 moles) of bis-(3,5-dimethyl-4-hydroxyphenyl)sulfone, 50 ml of methylene chloride, and 70 ml of N-methyl-2-pyrrolidone (NMP). The mixture was stirred under nitrogen until a homogeneous solution was obtained. At this point 12.8 g (0.31 moles) of 97% sodium hydroxide pellets were added. The resulting mixture was stirred at room temperature for 1 hour and then heated to 70° C. A heavy white precipitate formed after 1 hour. The viscous mixture was diluted with 50 ml of NMP and heated to 100° C. After 24 hours at 100° C. the reaction was diluted with 148 ml of chlorobenzene, cooled to room temperature, and then filtered. The recovered polymer was isolated by coagulation in methanol and then dried in a vacuum oven overnight at 60° C. Its reduced viscosity in chloroform (0.5 g/100 cc) was 0.30 dl/g.

EXAMPLE 2

In a flask, equipped with stirrer, reflux condenser, thermometer and dropping funnel are placed
  76.50 g. Bis-(3,5-dimethyl-4-hydroxyphenyl) sulfone (0.25 moles)
  57.00 g Bisphenol-A (0.25 mole)
  300 cc Dimethylsulfoxide (DMSO)
  76.7 g. 52.16% NaOH (1.0 mole)
under nitrogen atmosphere. This mixture is heated with stirring to 70° C. and a solution of 39.5 g. $CH_2Cl_2$ (0.465 mole) in 30 cc DMSO added over ½ hour. Thereafter, the temperature is maintained ½ hr. each at 70°–75°, 75°–80°, 80°–85°, 90°–95° and 115°–120°. A Dean-Stark trap filled with benzene is then inserted below the condenser and there is added to the reaction mixture 70 cc. benzene and 1.65 cc. 65% NaOH (34.6 mmol) and the water in the mixture is azeotroped off. The mixture is cooled to 90°–95° and a solution of 3.61 g. $CH_2Cl_2$ (0.0425 mole) in 20 cc. DMSO (Ratio $CH_2Cl_2$:Bisphenols is 1.015) added over ½ hr. The mixture is then kept at 95°–110° for 1¼ hr. during which time the viscosity increases appreciably. 5 mmole each of phenol and sodium phenate are added and heating continued ½ hr. at 110° to insure complete reaction.

The polymer solution is poured out into a beaker and allowed to cool and filtered. The polymer is isolated by coagulation in methanol. The product is dried in a vacuum oven overnight at 50°–60°.

EXAMPLE 3

30.60 g. bis-(3,5-dimethyl-4-hydroxyphenyl) sulfone (0.1 mole)
  22.80 g. Bisphenol-A (0.1 mole)
  15.45 g. 52.3% NaOH (0.202 mole)
  22.14 g. 51.2% KOH (0.202 mole)
  100 cc of DMSO
  30 cc Toluene
are mixed under nitrogen and the water distilled off by azeotropic reflux. The mixture is cooled to 85°–90° C. and a solution of 17.0 g $CH_2Cl_2$ (0.2 mole) in 20 cc DMSO added over 80 min. The temperature is raised to 90°–95° C. for ½ hr. and 100 C.° for ¼ hr. The viscosity of the mixture is quite high. Five mmol of potassium phenate is added and the mixture heated ½ hr at 110° C. then allowed to cool to room temperature. The polymer is isolated by coagulation in methanol. The polymer is filtered and dried in a vacuum oven at 60° C.

EXAMPLE 4

Example 1 is repeated except that 91.20 grams of Bisphenol-A (0.40 moles) and 30.60 grams of bis-(3,5-dimethyl-4-hydroxyphenyl)sulfone (0.16 moles) are employed instead, and the resulting polyformal is a tough film forming material.

EXAMPLE 5

A blend of six grams of a styrene/acrylonitrile copolymer (28% acrylonitrile)* and six grams of the polyformal of Example 1 above was prepared in methylene chloride. The resultant solution was single phase and films cast from this solution were transparent. Cast films were thoroughly devolatilized and then compression molded at 230° C. The resultant product was transparent. The resilience-temperature data (see method described in "Polymer-Polymer Miscibility" Olabisi, O. et al. p. 126, Academic Press, New York, 1979) gave a single glass transition temperature for the blend of 125° C. demonstrating the miscibility of this system (the styrene/acrylonitrile copolymer exhibits a Tg of 100° C. by this method), and the glass transition temperature of polyformal was 168° C. as measured using a differential scanning calorimeter. The polyformal is a heat distortion builder for styrene/acrylonitrile copolymer and therefore for ABS.
*The copolymer has the following properties:

EXAMPLE 6

A blend of six grams of a styrene/acrylonitrile copolymer (24% acrylonitrile) with a Vicat Softening Point of >217° F. and six grams of the polyformal as described in Example 1 was prepared in methylene chloride. The resultant solution was single phase and films cast from this solution were transparent. Cast films were thoroughly devolatilized and compression molded at 230° C. in a 4″×4″×0.020″ cavity mold. The resultant product was transparent and had a single Tg of 127° C. This blend was also miscible.

| Properties | Specimen | Test Methods | Typical Values (unless otherwise noted) |
|---|---|---|---|
| Values From Mechanical Tests | | | |
| Izod Impact Strength at 23° C., ft.-lb./inch notch | ¼ × ½ × 2½ inch | D 256 | 0.55 |
| Izod Impact Strength at 23° C., ft.-lb./inch notch | ¼ × ½ × 2½ inch | D 256 | 0.45 |
| Tensile Strength, lb./inch² | ⅛-inch tensile bar | D 638 | 11,200 |
| Elongation in Tension, per cent | ⅛-inch tensile bar | D-638 | 3.0 |
| Modulus of Elasticity in Tension, lb./inch² | ⅛-inch tensile bar | D 638 | 5.5 × 10⁵ |
| Flexural Strength, lb./inch² | ¼ × ½ × 5 inch | D 790 | 17,500 |
| Modulus of Elasticity in Flexure, lb./inch² | ¼ × ½ × 5 inch | D 790 | 5.7 × 10⁵ |
| Values From Miscellaneous Tests | | | |
| Rockwell Hardness, R Scale | ⅛ × 4 × 9 inch | D 785 | 125 |
| Water Absorption, gain in weight, per cent | ⅛ × 4 × 9 inch | D 570 | 0.23 |
| Refractive Index, 23° C. | ⅛ × 4 × 9 inch | D 542 | 1.565 |
| Deflection Temperature at 264 psi., °F. (unannealed specimen) | ¼ × ½ × 5 inch | D 648 | 202 |
| Vicat Softening Point, °F. | ¼ × ½ × 5 inch | D 1525 | 220 |
| Values From Electrical Tests | | | |
| Dielectric Strength, Short Time, volts/mil | ⅛ × 4 × 9 inch | D 149 | 400, minimum |
| Volume Resistivity, ohm-cm. | ⅛ × 4 × 9 inch | D 256 | 10¹⁵, minimum |
| Dielectric Constant, 0, 10³, 10⁶ cycles | ⅛ × 4 × 9 inch | D 150 | 3.4 maximum |
| Dissipation Factor, 60, 10³, 10⁶ cycles | ⅛ × 4 × 9 inch | D 150 | 0.10 maximum |

EXAMPLE 7

A blend of six grams of poly(vinyl chloride) homopolymer ("PVC" hereinafter) with an intrinsic viscosity of 0.63 (as measured by ASTM D-1243 Method A) and six grams of the polyformal of Example 1 was dissolved in tetrahydrofuran. TM-181 (an organotin stabilizer sold by Cincinnati-Milacron) was added to stabilize the PVC at the level of 3 wt. % (based on PVC weight). The resultant solution was transparent and cast films from the solution were also transparent. The sample was thoroughly devolatilized and compression molded into a 4″×4″×0.020″ cavity mold. The resultant molded sheet was transparent and exhibits a single Tg of 105° C. by the resilience method discussed in Example 5 above. This example demonstrates that the polyformal is miscible with PVC and is a heat distortion builder for PVC as evidenced by the increase in the glass transition temperature of PVC. Polyvinyl chloride exhibits a Tg of 75° C. (with 3% TM-181) as measured by the same technique.

EXAMPLE 8

A blend of 4 grams of the tetramethyl Bisphenol S polyformal of Example 1 and 6 grams of a styrene/acrylonitrile copolymer (42 wt.% An) having a reduced viscosity of 0.50 as measured in methyl ethyl ketone was prepared in methylene chloride. The solution was clear, the cast film was clear, and the compression molded 20 mil thick sample was transparent. The resilience-temperature data gave a single glass transition of 135° C. thus indicating miscibility for this blend.

We claim:

1. A moldable and compatible blend of 5 to 95 weight percent aromatic polyformal comprising from about 20 weight percent to 100 weight percent of repeating units (I) having the formula

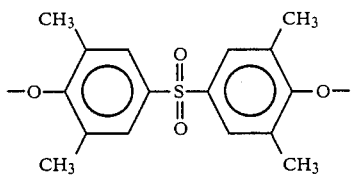

and from 0 weight percent to about 80 weight percent of repeating units (II) having the formula

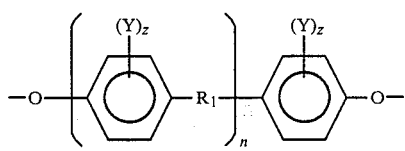

in which the repeating units (I) or the repeating units (I) and the repeating units (II) are connected by interbonding units (III) having the formula

wherein Y is selected from alkyl groups of 1 to 4 carbon atoms, chlorine or bromine, each z, independently, has a value of from 0 to 4 inclusive, n has a value of 0 or 1, and $R_1$ is a divalent saturated or unsaturated aliphatic hydrocarbon radical, O, CO, $SO_2$, S or a direct bond, with the proviso that when $R_1$ is $SO_2$ then repeating unit (II) is not the same as repeating unit (I), and 95 to 5 weight percent of a styrene copolymer or terpolymer, vinyl chloride containing polymers or mixtures thereof.

2. A blend as defined in claim 1 wherein the styrene copolymer is an styrene-acrylonitrile-butadiene copolymers.

3. A blend as defined in claim 2 where in the ratio of the polymers is 25 to 75 to 75 to 25 weight ratio.

4. A molded article made by the molding of the blend of claim 1.

5. A blend as defined in claim 1 wherein the vinyl chloride containing polymer is poly(vinylchloride).

6. A blend as defined in claim 1 wherein the vinyl chloride containing polymer contains up to 50 wt. % of an olefinically unsaturated compound.

7. A blend as defined in claim 1 wherein the styrene copolymer is styrene-acrylonitrile.

8. A blend as defined in claim 1 wherein the styrene-acrylonitrile copolymer contains between 12 and 44 wt.% acrylonitrile.

9. A blend as defined in claim 1 wherein the styrene copolymer is α-methyl styrene-acrylonitrile.

10. A blend as defined in claim 1 containing styrene-acrylonitrile-butadiene copolymers and a vinyl chloride containing polymer.

11. A blend as defined in claim 1 wherein a triarylphosphate ester is added at a weight percent of 2 to 12.

12. A blend as defined in claim 1 wherein the styrene copolymer is styrene-maleic anhydride.

13. A blend as defined in claim 1 wherein the styrene terpolymer consists of a styrene-acrylonitrile copolymer grafted onto an acrylate elastomeric backbone.

14. A blend as defined in claim 1 wherein the styrene terpolymer consists of a styrene-acrylonitrile copolymer grafted onto an ethylene-propylene-diene monomer elastomer.

15. A blend as defined in claim 1 which contains a polymer exhibiting mechanical compatibility with the blend.

16. A blend as defined in claim 15 wherein the polymer is an aromatic polycarbonate.

17. A blend as defined in claim 16 wherein the aromatic polycarbonate is derived from bisphenol A.

18. A blend as defined in claim 15 wherein the polymer is a polyester.

19. A blend as defined in claim 18 wherein the polyester is poly(butylene terephthalate).

20. A blend as defined in claim 15 wherein the polymer is a polyarylate.

21. A blend as defined in claim 15 wherein the polymer is a poly(ether imide).

* * * * *